US011102872B2

United States Patent
Adenau

(10) Patent No.: US 11,102,872 B2
(45) Date of Patent: Aug. 24, 2021

(54) METHOD FOR OPERATING A CONTROL SYSTEM FOR CONTROLLING A LIGHTING SYSTEM

(71) Applicant: MA LIGHTING TECHNOLOGY GMBH, Waldbüttelbrunn (DE)

(72) Inventor: Michael Adenau, Würzburg (DE)

(73) Assignee: MA LIGHTING TECHNOLOGY GMBH, Waldbüttelbrunn (DE)

( * ) Notice: Subject to any disclaimer, the term of this patent is extended or adjusted under 35 U.S.C. 154(b) by 0 days.

(21) Appl. No.: 16/769,785

(22) PCT Filed: Dec. 11, 2017

(86) PCT No.: PCT/EP2017/082172
§ 371 (c)(1),
(2) Date: Jun. 4, 2020

(87) PCT Pub. No.: WO2019/114919
PCT Pub. Date: Jun. 20, 2019

(65) Prior Publication Data
US 2021/0176845 A1  Jun. 10, 2021

(51) Int. Cl.
*H05B 47/16* (2020.01)
*H05B 47/165* (2020.01)
*H05B 47/18* (2020.01)

(52) U.S. Cl.
CPC ........... *H05B 47/165* (2020.01); *H05B 47/16* (2020.01); *H05B 47/18* (2020.01)

(58) Field of Classification Search
CPC ...... H05B 47/10; H05B 47/16; H05B 47/165; H05B 47/18; H05B 47/14
See application file for complete search history.

(56) References Cited

U.S. PATENT DOCUMENTS

| 8,138,689 | B2 | 3/2012 | Adenau |
| 2002/0135315 | A1* | 9/2002 | Puleo, Sr. ............ H05B 47/155 315/185 R |
| 2002/0195975 | A1 | 12/2002 | Schanberger et al. |
| 2004/0075401 | A1* | 4/2004 | Segan .................. H05B 47/155 315/291 |

FOREIGN PATENT DOCUMENTS

DE 102009007526 A1 8/2010

OTHER PUBLICATIONS

PCT International Search Report, PCT/EP2017/082172, dated Sep. 21, 2018, 5 pages.
PCT English Language Translation of the International Preliminary Report on Patentability, PCT/EP2017/082172, dated Jun. 25, 2020, 9 pages.

* cited by examiner

*Primary Examiner* — Jimmy T Vu
(74) *Attorney, Agent, or Firm* — Quarles & Brady LLP

(57) ABSTRACT

A method for operating a control system for controlling a lighting system. The control system includes at least two lighting control modules, each lighting control module including at least one digital processor and at least one digital memory for generating, managing and storing lighting programs. Each lighting control module includes a housing in which the digital processor and the digital memory are disposed. Digital adjusting commands are generated in each lighting control module, and are transmittable to the lighting devices of the lighting system via data links. The different lighting control modules are able to exchange data via data lines and interfaces. A system time signal is generated in a lighting control module and is transmitted to all lighting control modules of the control system via the data lines, and the lighting programs in the different lighting control modules are executed using the system time signal.

8 Claims, No Drawings

METHOD FOR OPERATING A CONTROL SYSTEM FOR CONTROLLING A LIGHTING SYSTEM

This application represents the national stage entry of PCT International Application No. PCT/EP2017/082172 filed Dec. 11, 2017, which is incorporated herein by reference for all purposes.

The disclosure relates to a method for operating a control system for controlling a lighting system according to the preamble of claim 1.

Known control systems, which can, for instance, be realized by lighting control consoles, serve for controlling lighting systems such as those employed in theaters or on concert stages, for instance. Routinely, said lighting systems comprise a plurality of lighting devices, for instance stage spotlights, wherein, in the lighting systems on their own, it is in many cases also possible to switch between a plurality of lighting states, for instance between different colors and intensities. These different lighting devices with their different lighting states are controlled by programmed parameters in the lighting program of the control system.

Standard lighting systems may comprise up to several thousand lighting devices. In order to be able to control such complex lighting systems, the individual lighting control modules, which can, for instance, be lighting control consoles, are equipped with a digital processor which permits digital data and signal processing. A digital memory is further provided for storing the data, said digital memory in particular allowing lighting programs to be archived and then accessed when necessary. In order to guarantee the control system's operational safety even in the case of failure of individual lighting control modules, the control system generically comprises several lighting control modules which can execute individual lighting programs separately and control specific parts of the lighting system. By providing a control system which is realized by combining several lighting control modules, the technical performance of the control system can also be adjusted to the respective requirements in a simple manner because in order to increase the performance, it is merely necessary to integrate additional lighting control modules into the control system. A generic control system for controlling a lighting system is known from U.S. Pat. No. 8,138,689, for example.

Since the individual lighting control modules of known control systems for controlling a lighting system each operate independently, it is necessary to coordinate the timing of the program sequence in the individual lighting control modules. In the case of known control systems, this coordination of the timing is effected by jointly starting all lighting control modules by means of a predefined start signal. Subsequently, the individual lighting control modules execute their respective lighting programs independently, wherein a time synchronization is not provided. Due to the fact that the time measuring devices in the individual lighting control modules do not match absolutely exactly, it may occur in the case of longer program sequences that the program sequence of the individual lighting control modules does no longer match absolutely exactly due to the time measuring differences. This inadequate time synchronization among the individual lighting control modules increases the longer the lighting programs run. Additionally, it is a disadvantage that the possibility of time synchronization among the individual lighting control modules is not provided when programming the lighting control modules because all lighting control modules must be restarted jointly after changing individual parameters in the lighting programs for a test of the lighting programs. Testing newly programmed lighting programs is thus made considerably more difficult.

Starting from this state of the art, it is therefore the object of the present disclosure to propose a novel method for operating a control system for controlling a lighting system which avoids the disadvantages described above.

Advantageous embodiments of the disclosure are the subject-matter of the dependent claims.

The method according to the disclosure is based on the fundamental idea that a system time signal is generated in a lighting control module, said system time signal serving the purpose of synchronizing the timing of the different lighting control modules in the control system. After the system time signal has been generated, it is transmitted to all lighting control modules associated with the control system via data lines. By receiving the system time signal, the timing of all lighting control modules of the control system can be synchronized. When the lighting programs are executed in the different lighting control modules, the signal processing is executed using the system time signal.

As a result, a time synchronization of all lighting control modules is allowed during operation of the individual lighting programs by means of the system time signal, which is transmitted to all lighting control modules of the control system. Differences in timing among the individual lighting control modules can easily be eliminated in this way before noticeable differences in timing among the individual lighting control modules occur. In addition, lighting programs can be tested in a synchronized manner without always having to reset all lighting programs to the starting point.

How often a system time signal for synchronizing the individual lighting control modules is generated is basically arbitrary. The system time signal is preferably generated so as to reoccur at regular time intervals and is transmitted to all lighting control modules.

The time interval between the individual system time signals can in this case preferably be within the range of 5 ms to 50 ms, in particular 30 ms. In other words, a time synchronization of all lighting control modules by means of the system time signal is effected at a repetition rate of 5 ms to 50 ms.

How the lighting control modules are designed in the control system is basically arbitrary. According to a preferred embodiment, the method for operating a control system is provided, in which case at least one lighting control module is realized in the manner of a lighting control console. The lighting control console comprises several control elements in this case, in particular pushbuttons, slide controls and/or rotary knobs, which are disposed on the upper surface of the housing. In this case, the operator can enter control commands at the control elements during the programming and during operation of the lighting programs. Additionally, the lighting control console comprises at least one display device, for example a color display.

The method according to the disclosure is of particular importance if at least one lighting control module of the control system comprises a digital processor which calculates an effects engine for generating lighting effects. This is because in the case of the time synchronization of these lighting effects, even the smallest time deviations are very disturbing. By means of the time synchronization using the system time signal, the lighting effects can be realized with maximum precision in synchronized form.

How the lighting effect is calculated in the effects engine of the respective lighting control module is also basically arbitrary. The method according to the disclosure offers major advantages, if a time-dependent calculation formula E=F(t) is used for calculating the lighting effect in the effects engine. This is because such mathematical algorithms for defining lighting effects are indeed advantageous in view of the necessary memory requirements, but they are highly sensible in view of the time synchronization when displaying several lighting effects of different lighting control modules. Time synchronization by means of the system time signal according to the disclosure can easily solve these problems.

The invention claimed is:

1. A method for operating a control system for controlling a lighting system, the control system comprising at least two lighting control modules, each lighting control module comprising at least one digital processor and at least one digital memory for generating, managing and storing lighting programs, the lighting programs controlling a color of at least one stage spotlight, and each lighting control module comprising a housing in which the digital processor and the digital memory are disposed, and digital adjusting commands being generated in each lighting control module, said digital adjusting commands being transmittable to the lighting devices of the lighting system via data links, and the different lighting control modules being able to exchange transfer data with each other via data lines and data interfaces
wherein
 a) a system time signal is generated in a lighting control module,
 b) the system time signal is transmitted to all lighting control modules of the control system via the data lines,
 c) the lighting programs in the different lighting control modules are executed using the system time signal to adjust the color of the at least one stage spotlight.

2. The method according to claim 1, wherein for a time synchronization of all lighting control modules of the control system, generating and transmitting the system time signal is repeated at regular time intervals.

3. The method according to claim 1, wherein the regular time interval between the individual system time signals is within the range of 5 ms to 50 ms.

4. The method according to claim 1, wherein at least one lighting control module is realized in the manner of a lighting control console, the lighting control console comprising several control elements-which are disposed on the upper surface of the housing, and the operator being able to enter control commands at the control elements, and the lighting control console comprising at least one display device.

5. The method according to claim 1, wherein at least one lighting control module comprises a digital processor which calculates an effects engine for generating lighting effects.

6. The method according to claim 5, wherein a time-dependent calculation formula E=F(t) is used for calculating the lighting effect in the effects engine.

7. The method according to claim 1, wherein the regular time interval between the individual system time signals is 30 ms.

8. The method according to claim 4, wherein the control elements comprise a pushbutton, a slide control, and/or a rotary knob.

* * * * *